US006802975B2

(12) United States Patent
Ingerle

(10) Patent No.: US 6,802,975 B2
(45) Date of Patent: Oct. 12, 2004

(54) METHOD FOR BIOLOGICAL EFFLUENT TREATMENT

(76) Inventor: Kurt Ingerle, Josef Abentungweg 37, Götzens (AT), A-6091

( * ) Notice: Subject to any disclaimer, the term of this patent is extended or adjusted under 35 U.S.C. 154(b) by 145 days.

(21) Appl. No.: 10/168,654

(22) PCT Filed: Nov. 30, 2000

(86) PCT No.: PCT/AT00/00322

§ 371 (c)(1),
(2), (4) Date: Nov. 8, 2002

(87) PCT Pub. No.: WO01/46075

PCT Pub. Date: Jun. 28, 2001

(65) Prior Publication Data

US 2003/0164331 A1 Sep. 4, 2003

(30) Foreign Application Priority Data

Dec. 21, 1999 (EP) .............................................. 99890398

(51) Int. Cl.⁷ .................................................. C02F 3/00
(52) U.S. Cl. ...................... 210/607; 210/621; 210/629; 210/220; 210/623; 210/744
(58) Field of Search ................................ 210/607, 621, 210/629, 220, 623, 744

(56) References Cited

U.S. PATENT DOCUMENTS 5,228,996 A  *  7/1993  Lansdell ..................... 210/605

FOREIGN PATENT DOCUMENTS

| EP | 0 339 013 | 10/1989 |
| WO | WO 97/08104 | 3/1997 |
| WO | WO 98/37026 | 8/1998 |

\* cited by examiner

Primary Examiner—Chester T. Barry
(74) Attorney, Agent, or Firm—Ohlandt, Greeley, Ruggiero & Perle, L.L.P.

(57) ABSTRACT

The invention relates to a method of biological treatment of wastewater by means of activated sludge, wherein the wastewater is introduced first into an aerated activated sludge tank (B tank) and then by turns into one of several sedimentation and recirculation tanks (SU tanks), which are permanently linked with said B tank and in which a separation of activated sludge and clear water occurs, and after separation activated sludge is returned to the B tank and clear waters is drawn off; several times a day, in the SU tanks an operating cycle proceeds comprising a stirring phase (R phase), a pre-settling phase (V phase) and a discharge phase (A phase). In the R phase the activated sludge is remixed with the water, in the V phase the activated sludge settles down and in the A phase clear water is drawn off (single basin technique). The cycles in the SU tanks are phase displaced to each other and the A phases are adjacent, so only in the A phases the SU tanks are flown through, an approximately constant water level is present; thus causing an outflow from the purification plant which corresponds to its inflow (throughflow principle). Before the R phase settled and thickened activated sludge is reintroduced from the SU tank into the B tank.

10 Claims, 4 Drawing Sheets

Fig 1
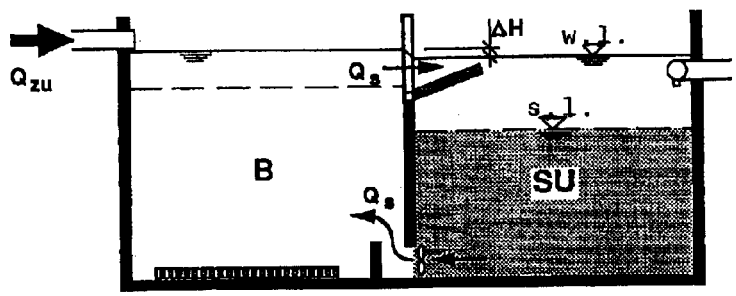
Fig 1a
S phase
(with stirring device)
$Q_{zu} \ll Q_S$
$Q_S < Q_R$
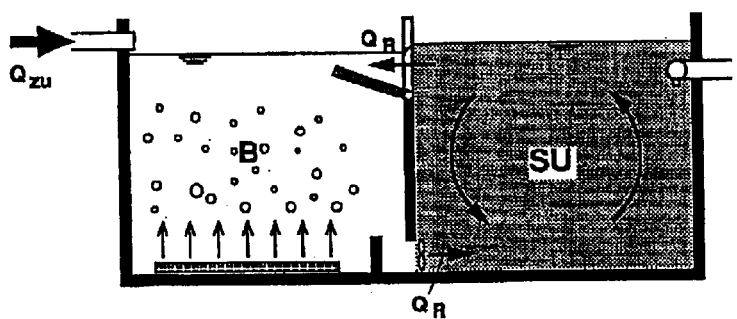
Fig 1b
R phase
(with stirring device)
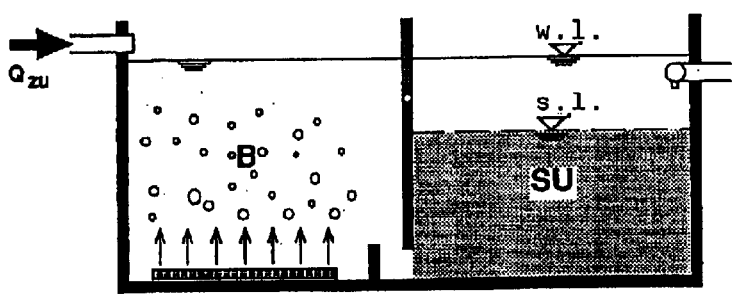
Fig 1c
V phase
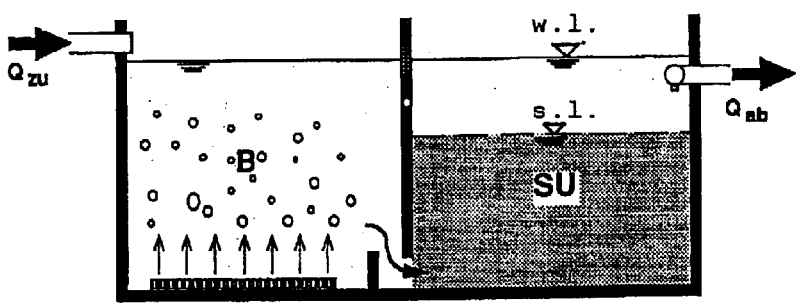
Fig 1d
A phase
$Q_{zu} = Q_{ab}$

Fig 2
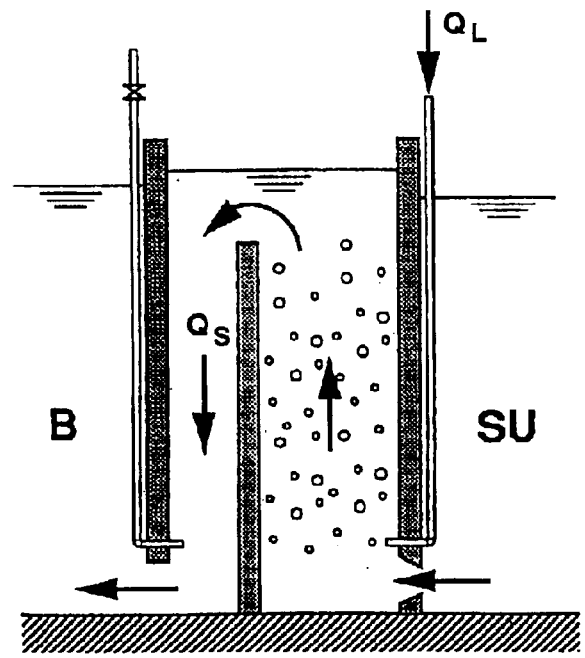
Fig 2a
S phase
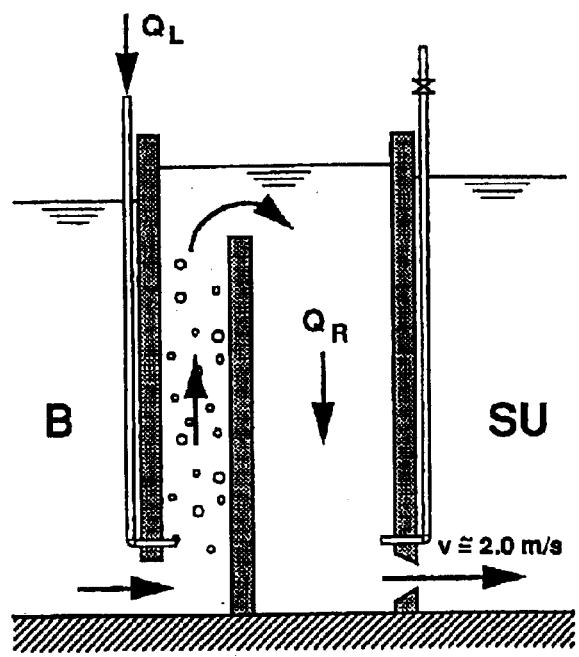
Fig 2b
R phase

Fig 3
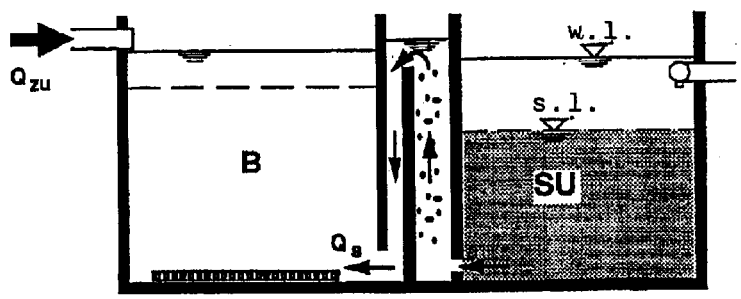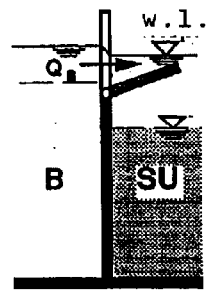
Fig 3a
S phase
$Q_{zu} \ll Q_S$
$Q_S < Q_R$
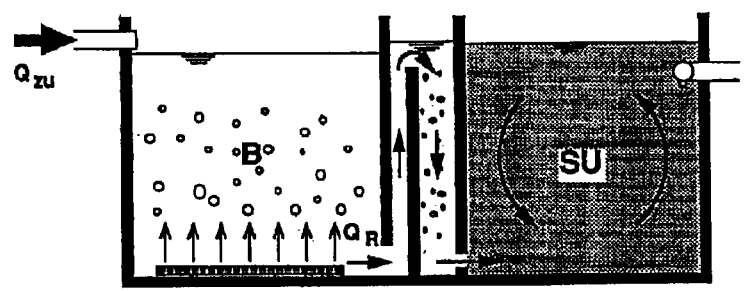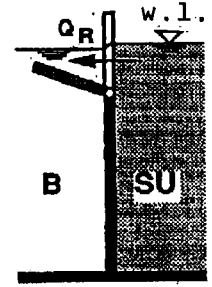
Fig 3b
R phase
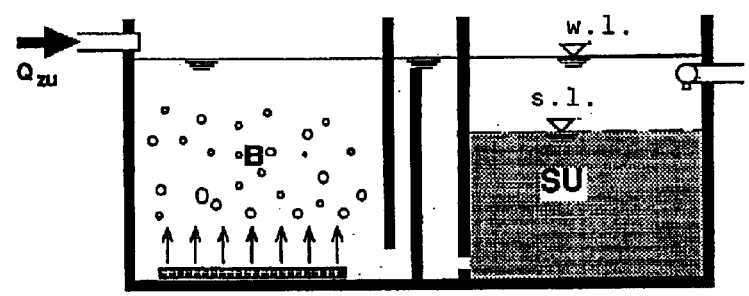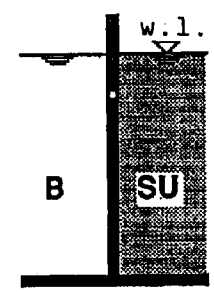
Fig 3c
V phase
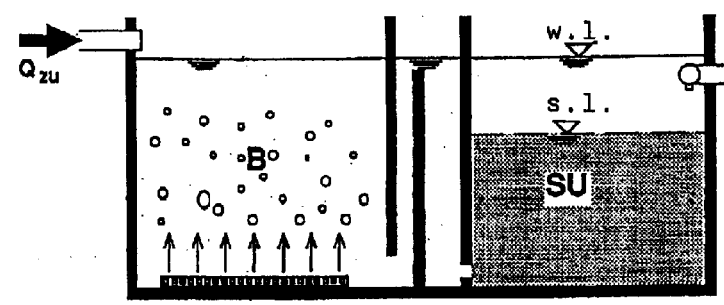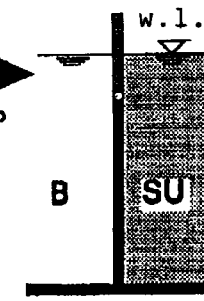
Fig 3d
A phase
$Q_{zu} = Q_{ab}$

Fig 4
Fig 4a
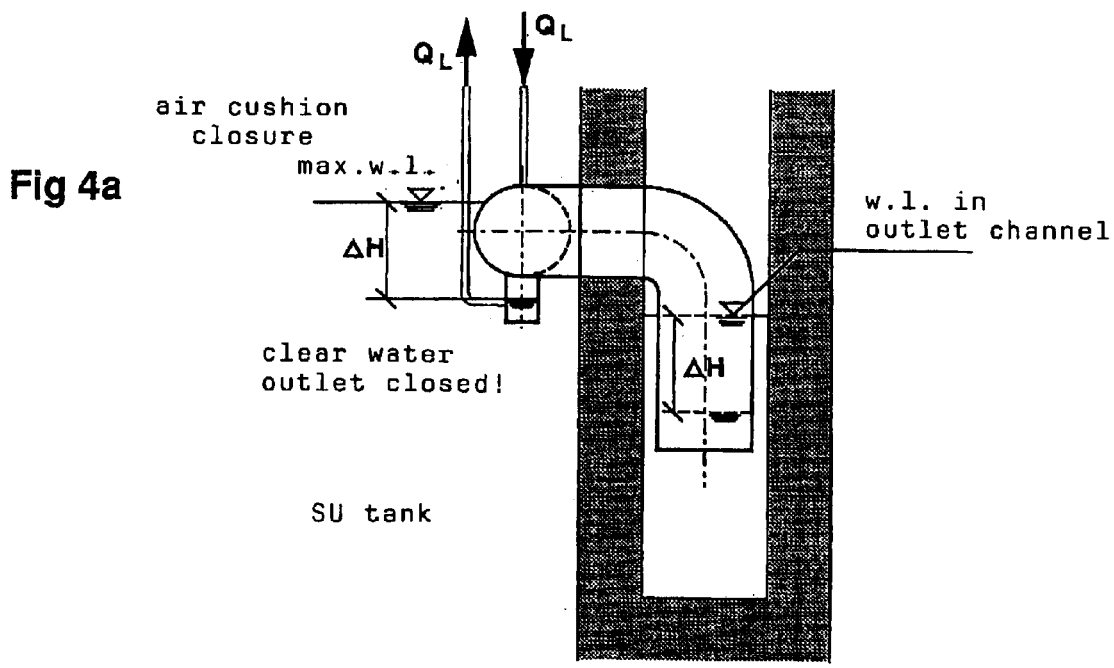
Fig 4b
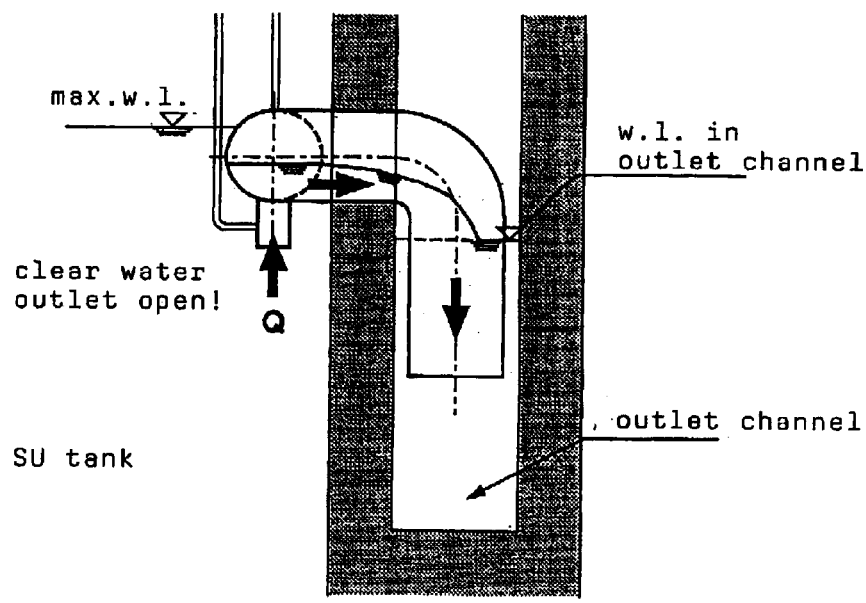

METHOD FOR BIOLOGICAL EFFLUENT TREATMENT

BACKGROUND OF THE INVENTION

1. Field of the Invention

The invention relates to a method for biological purification of municipal or like wastewater by means of activated sludge, wherein the wastewater is introduced first into an aerated activated sludge tank (B tank) and then by turns into one of several sedimentation and recirculation tanks (SU tanks), which are permanently linked with said B tank and in which, several times a day an operating cycle proceeds comprising a stirring phase (R phase), a pre-settling phase (V phase) and a discharge phase (A phase), wherein in turns in the R phase the activated sludge is remixed with the water, in the V phase the activated sludge settles down and in the A phase clear water is drawn off and wherein the cycles in the SU tanks are phase-displaced to each other and the A phases are adjacent, only in the A phases the SU tanks are flown through, an approximately constant water level is present, thus causing an outflow from the purification plant corresponding to its inflow (throughflow principle).

2. Description of the Prior Art

From the European patent application EP 968 965 a method for biological wastewater purification by means of activated sludge is known where the wastewater is introduced first into an aerated activation tank and then into a settling tank, in which a separation of activated sludge and clear water occurs and after separation activated sludge is returned into the activation tank and clear water is discharged. Several times a day an operating cycle is performed, comprising a stirring phase, a secondary settling phase and a discharge phase, wherein in the stirring phase the activated sludge is remixed with the water, in the secondary settling phase the activated sludge settles down and in the discharge phase clear water is drawn off. According to the above method of prior art, the purification is done in a biological two-tank system—the activation and the sedimentation tanks with continuous inflow and intermittent outflow. In the intervals without outflow the water level rises due to the inflow (damming-up principle). The patent claim of this method consists in that after the pre-settling phase and before the stirring phase settled activated sludge is returned into the activation tank of the "two-tank system with damming-up operation". That this method relates to a damming-up operation can be seen from the description of the document (pages 14 and 15) as well, stating: "that water is introduced permanently to the first region and from there it spills into the second region. A discharge of purified drain water is performed here only during the third step of the method. During the other steps the drain water accumulates in both regions or—in the case of presence of an anaerobic pre-treatment—also in this region." Also in claim 1 it is clearly evident that it concerns "two-tank systems with damming-up operation" which "are connected in parallel and operated time-delayed." This method of prior art is very suitable for small purification plants. For middle or large-scale purification plants, however, it is far better to use the throughflow principle. Then the outflow from the purification plant corresponds to the inflow.

A similar method is known from the WO 97/08104, where at the beginning of each cycle the same sludge concentration is adjusted in the activation and sedimentation tanks, the reintroduction of the non-settled activated sludge occurring during the stirring phase. A reintroduction of settled and well-thickened activated sludge before the stirring phase is not provided for.

Furthermore, a similar method is known from the European patent EP 0 670 817 B1 of Dec. 29, 1999, where the wastewater is treated in two cells, wherein the wastewater is aerated an mixed in the treatment and discharge cell and wherein the reintroduction of sludge from the treatment and discharge cell into the first treatment cell occurs during the mixing period (B and R phase). Here it is essential that cell aeration and mixing is done in the treatment and discharge and no settled and thickened activated sludge is let to reintroduction, which is why a longer time is needed for the reintroduction and a smaller content of dry substance in the first treatment cell is achieved, thus a loss in time for the other phases comes about (compare claim 1 of the document).

A similar method is known from the European application EP 1 110 916 of Jan. 17, 2000. In a purification plant operating according to the throughflow principle and exploiting the one-basin technology, settled and thickened activated sludge is returned after the V phases and before the R phases into the first treatment tank. The reintroduction of sludge is done in a relatively short time, which makes a large return amount necessary.

The EP 0 399 013 relates to a facility for wastewater processing, in which buffering of larger amounts of wastewater (wastewater impacts) is possible in a simple way; this is achieved in that the closure means of the outlet of the activation tank comprising a moveable closure body made from an elastically deformable foil. The fluid from the activation tank is transported into the secondary clearing tank by means of a air-jet lift. On the bottom of both tanks a closeable opening is provided which serves for transporting settled sludge from the secondary clearing tank into the activation tank and which is opened only for a short time. Thus, the connection of the two tanks is hydraulically interrupted and causes different water level positions in the two tanks. The method underlying this facility is an activation method operating according to the damming-up principle with intermittent, short-time reintroduction of sludge from the post-clearing tank into the activation tank, as opposed to the throughflow method as cited in the beginning.

SUMMARY OF THE INVENTION

The invention is based on the problem to improve the above-described methods for biological wastewater purification in a manner that allows application in middle and large-scale purification plants by using the throughflow principle and, at the same time, achieving a higher sludge concentration in the activation tank at a shorter reintroduction time through the reintroduction of settled and well-thickened activated sludge. This problem is solved by the features of claim 1, according to which after the V phases and before the R phases, settled and thickened activated sludge is reintroduced into the B tank from the SU tanks (S phase).

BRIEF DESCRIPTION OF THE DRAWINGS

FIG. 1: a schematic representation of the individual phases during a cycle,

FIG. 2: a schematic representation of a duplex siphon for the transport of fluids in both directions, FIG. 3: a schematic representation of the individual phases during a cycle using a duplex siphon, and FIG. 4: a schematic representation of a clear water outlet (air pressure closure).

DETAILED DESCRIPTION OF THE INVENTION

The invention is distinguished in that, in order to achieve the throughflow principle, the activation tank (B tank) is permanently connected hydraulically with several sedimentation and recirculation tanks (SU tanks), wherein in the SU tanks, several times a day, an operating cycle proceeds comprising a stirring phase (R phase), a pre-settling phase (V phase) and a discharge phase (A phase). In the R phase the activated sludge is remixed with the water, in the V phase the activated sludge settles down and in the A phase clear water is drawn off. The cycles in the SU tanks are phase displaced in such a manner that the A phases are adjacent to each other, thus causing an outflow from the purification plant which corresponds to its inflow (throughflow principle). In this context it is essential that before the R phase, settled and well-thickened activated sludge is reintroduced into the B tank (S phase). Advantageously, a high sludge concentration in the B tank and a short return time is achieved in the case when the reintroduction is done only after termination of the draw-off phase of clear water (A phase).

The activated sludge being reintroduced is suitably taken from the bottom of the SU tank since there will occur the highest sludge concentration.

By the reintroduction of the settled sludge, water is displaced in the B tank, which water is returned to the SU tank via an opening near to the surface. This water also contains activated sludge, however, in a lesser concentration as compared to the returned settled sludge. In order to minimize this sludge backflow, it is suitable according to the present invention to interrupt or throttle the aeration in the activation tank before starting the reintroduction of the activated sludge. By this measure the activated sludge whirled up by the aeration sinks until below the level of the surface-near opening, and the sludge concentration of the displaced water is reduced.

The surface-near openings are provided with flaps opening automatically and being closed in the V and A phases.

The reintroduction of settled sludge can be done with electrical devices (pumps, stirring devices) or by means of air-jet lifts.

The stirring in the SU tanks (R phase) can be done by several ways as well. Air may be by injected, electrically driven stirring apparatus may be used or air-jet lift.

For the reintroduction of the sludge and stirring in the SU tanks a combined air-jet lift according to FIG. 2 (duplex siphon) may be employed. In the case of presence of a fine-bubble aeration for the B tank this aeration can be turned off and the pressured air thus available can be employed for the operation of the duplex siphon. In this case it is important that for the stirring such a strong jet of water is generated which whirls up activated sludge sedimented on the bottom, homogenizes the content of the SU tank and transports floating sludge, which may have developed, into the B tank where it can reprocessed into the activated sludge.

A B tank may, e.g., be hydraulically connected with two SU tanks and the cycle times are assumed approx. 140 min: S phase approx. 5 min; R phase approx. 5 min; V phase approx. 60 min.; A phase approx. 70 min; A=(S+R+V).

With three SU tanks a cycle of approx. 105 min is obtained: S phase approx. 5 min; R phase approx. 5 min; V phase approx. 60 min; A phase approx. 35 min; A=(S+R+V):2.

For the outlet of the clear water a firmly mounted air-pressure closure has proved suitable (FIG. 4). For the surplus and floating sludge outlet, also an automatically working air-jet lift may be employed.

Further details of the invention can be taken from the following description, with reference to the drawing. Therein the figures show:

FIG. 1: a schematic representation of the individual phases during a cycle,

FIG. 2: a schematic representation of a duplex siphon for the transport of fluids in both directions, FIG. 3: a schematic representation of the individual phases during a cycle using a duplex siphon, and FIG. 4: a schematic representation of a clear water outlet (air pressure closure).

FIGS. 1a to 1d show schematic representations of the phases S, R, V and A. The vertical section along the direction of flow leads through the B tank and one of the at least two SU tanks. The continuous inflow is opposed to an outflow in the A phase only. The S and R phases are operated with stirring devices in this representation. The near-surface openings are closed in the V and A phases. The activation tank is denoted with B, and the sedimentation and recirculation tanks with SU. The S phase is illustrated schematically in FIG. 1a. Thickened sludge $Q_S$ is transported from the SU tank into the B tank by means of, in this case, a stirring apparatus through a permanently open opening situated near to the bottom, and the same amount $Q_S$ flows back via the opening situated near to the surface from the B tank to the SU tank. In place of a stirring apparatus e.g. a air-jet lift may be employed as well. FIG. 1b represents the stirring phase. In this case by means of a stirring apparatus a strong flow of fluid $Q_R$ is generated, which whirls up and homogenizes the content of the SU tank. A flow of equal size comes into the B tank from the SU tank via the surface-near openings. In FIG. 1c the V phase can be seen. While in the SU tank the sludge sediments and forms a defined sludge level, the B tank is aerated in this case with fine-bubble pressured air. Also the surface-near openings are closed. Finally, FIG. 1d shows the A phase, in which an outflow $Q_{ab}$ takes place which corresponds to the inflow $Q_{zu}$. The openings near to the surface are closed. An amount of fluid, corresponding to the inflow $Q_{zu}$ and consisting of water and sludge, flows to the SU tank through the permanently open hydraulic connection at the tank bottom.

In FIG. 2 a duplex siphon is depicted schematically. FIG. 2a shows the operation in the S phase, and FIG. 2b that in the R phase. In FIG. 2a, by introducing pressured air $Q_L$ (the air bubbles are shown) an amount of fluid $Q_S$ is transported from the SU tank into the B tank. In FIG. 2b an opposite fluid flow from the B tank into the SU tank is produced, wherein $Q_R$ is greater than $Q_S$. It is also essential that the flow of fluid $Q_R$ enters the SU tank with such a high flow velocity (v≈2.0 m/s), that sludge sediments on the bottom are whirled up and the content of the SU tank is homogenized.

FIGS. 3a to 3d show schematic representations of the phases S, R, V and A with usage of the duplex siphon depicted in FIG. 2. At the side the respective state of the openings positioned near to the surface with the flaps can be seen. For FIGS. 3a to 3d the discussion of FIGS. 1a to 1d is substantially applicable as well.

Finally, FIG. 4 shows a possible clear water outlet with air-pressure closure (air cushion closure). At distances of approximately 1 m, drainage sockets oriented vertically downward are arranged along a tube mounted horizontal.

For realizing the closure, pressured air $Q_L$ is forced into the horizontal tube. FIG. 4a shows a closed air-pressure closure, in which a small amount $Q_L$ of pressured air, continuously injected, evades through a small pipe in order to maintain a constant water level difference $\Delta H$. The maximal water level in the SU tank is denoted with "max.w.l." and the water level in the outlet channel with "w.l. in outlet channel". In the air-pressure closure an air pressure corresponding to the difference $\Delta H$ is present. In FIG. 4b an open air-pressure closure is depicted. The amount of outflow is Q. The outlet channel is, in this case, an open drain; it could be realized as a pressure pipe as well. Inside and outside of the air-pressure closure the same air pressure is present.

What is claimed is:

1. Method for biological purification wastewater by means of activated sludge, wherein the wastewater is introduced first into an aerated activated sludge tank (B tank) and then, by turns, into one of several sedimentation and recirculation tanks (SU tanks), which are permanently hydraulically linked with said B tank and in which, several times a day an operating cycle proceeds comprising a stirring phase (R phase), a pre-settling phase (V phase) and a discharge phase (A phase), wherein in turns in the R phase the activated sludge is remixed with the water, in the V phase the activated sludge settles down and in the A phase clear water is drawn off, and wherein the cycles in the SU tanks are phase displaced to each other, the A phases are adjacent, only in the A phases the SU tanks are flown through, an approximately constant water level is present, thus causing an outflow from the purification plant corresponding to its inflow (throughflow principle), wherein after the V phases and before the R phases settled and thickened activated sludge is reintroduced from the SU tank into the B tank (S phase).

2. Method of claim 1, wherein the reintroduction of settled activated sludge occurs during or preferable after the A phase.

3. Method of claim 2, wherein the volume displaced in the B tank during the S phase with less dry substance than the introduced settled activated sludge is returned via openings near to the surface into the SU tanks, and the surface-near openings allow a throughflow only in the S and R phases and are closed in the V and A phases.

4. Method of claim 1, wherein the stirring in the SU tanks (R phase) is done by injecting air, by means of electrically driven stirring apparatuses or by means of air-jet lifts.

5. Method of claim 1, wherein for reintroducing settled activated sludge and for stirring in the SU tanks (S and R phases) a combined air-jet lift (duplex siphon) is used, which allows a transport of fluid in both directions and provides a permanent hydraulic connection between the B tank and SU tanks in the V and A phases, wherein the stirring effect in the SU tanks is produced by generating a strong jet of water which whirls up activated sludge sedimented on the bottom, generates a water roll with homogenizing effect and transports possibly developing floating sludge via the surface-near openings into the B tank.

6. Method of claim 1, wherein the aeration of the B tank is intermittent in the R phases, in the S phases or in both.

7. Method of claim 1, wherein a B tank is hydraulically connected with two SU tanks and the cycle times are chosen based on approximately 140 min (S phase approx. 5 min; R phase approx. 5 min; V phase approx. 60 min; A phase approx. 70 min; A=(S+R+V)), or with three SU tanks and the cycle times are chosen based on approximately 105 min (S phase approx. 5 min; R phase approx. 5 min, V phase approx. 60 min; A phase approx. 35 min; (S+R+V); 2).

8. Method of claim 1, wherein an outlet is realized as a pneumatic closure having a horizontal tube and at least one drainage socket oriented downward, wherein into the horizontal tube pressured air can be injected.

9. Method of claim 1, wherein at the end of the V phase the sludge concentration is measured at a predelined depth of approximately 1.0 to 1.5 m below the water level, and at the end of the A phase thickened surplus sludge is drawn off for a short time (a few minutes) if the measurement of the sludge concentration revealed a sludge level lying above the measuring position.

10. Method of claim 1, wherein the B tank is permanently connected hydraulically with the SU tanks via one or more openings in the middle region (at about half the water depth), in the S phase thickened sludge is led from the bottom of the SU tank into the upper region (near to the surface) of the B tank and the content of the B tank thereby displaced is returned via the openings in the middle region of the tanks. In the R phase the content of the SU tank is whirled up and homogenized without generation of a circulating current over the B tank and in the A phase the flow from the B tank into the SU tanks occurs via the openings in the middle region as well.

* * * * *